Figure 1:
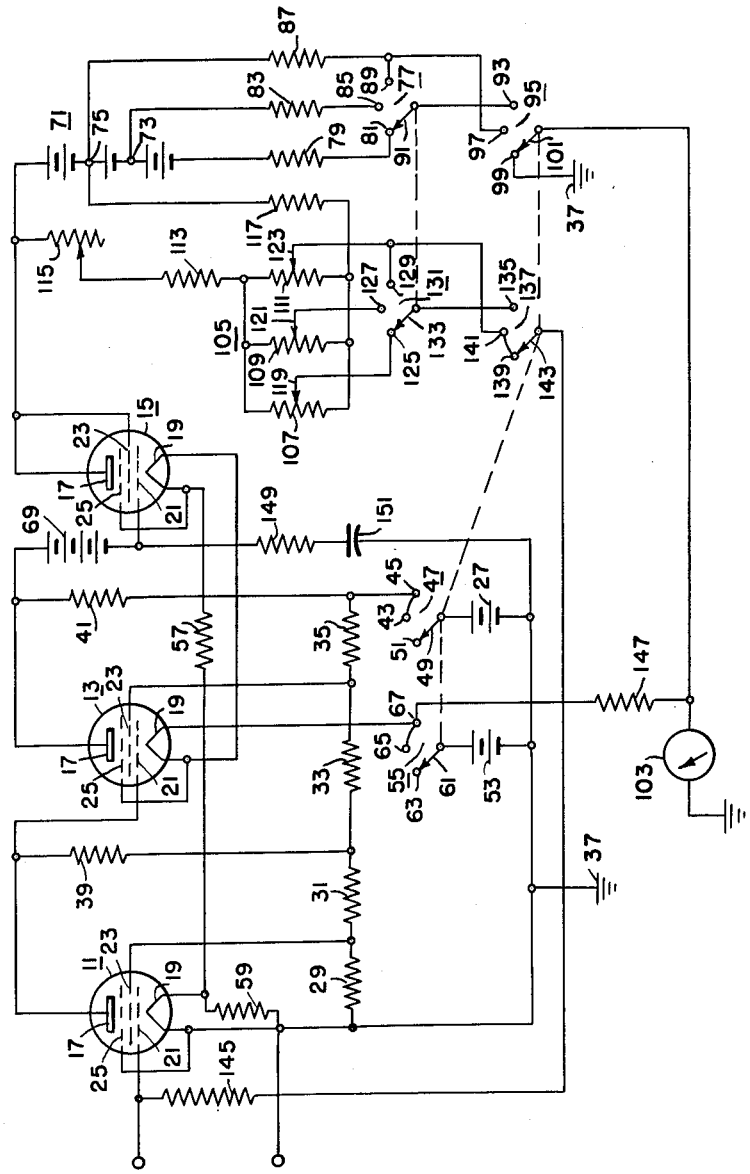

Feb. 28, 1956  P. A. DUFFY, JR., ET AL  2,736,861
MULTIRANGE DIRECT CURRENT METER AMPLIFIER
Filed Aug. 24, 1951                                    2 Sheets-Sheet 1

WITNESSES:
E. A. McCloskey.
Wm. T. Wofford

INVENTORS
Philip A. Duffy, Jr.,
and William J. Lee.
BY
F. E. Browder
ATTORNEY

United States Patent Office 2,736,861
Patented Feb. 28, 1956

2,736,861

MULTIRANGE DIRECT CURRENT METER AMPLIFIER

Philip A. Duffy, Jr., Catonsville, and William J. Lee, Baltimore, Md., assignors, by mesne assignments, to the United States of America as represented by the Secretary of the Army Application August 24, 1951, Serial No. 243,492

1 Claim. (Cl. 324—123)

Our invention relates to electrical apparatus for amplification and measurement of direct current signals, and more particularly to such apparatus having a plurality of sensitivity ranges and designed to operate over a wide range of input signals.

It is an object of our invention to provide improved apparatus for amplification and measurement of direct current signals, wherein it is possible to switch from one sensitivity range to another without disturbing the indicator device.

It is another object of our invention to provide multirange direct current amplifying and indicating apparatus wherein range switching may be accomplished without requiring separate zero adjustment of the indicator device.

It is another object of our invention to provide multirange direct current amplifying and indicating apparatus wherein sensitivity range switching is accomplished by a single control, and the indicator device will automatically read zero on each range when there is no signal input.

In accordance with our invention, we connect an indicator device, such as a microammeter, in the anode-cathode circuit of a multi-electrode electron discharge device, which is used as a direct current amplifier. We bias the control electrode of the discharge device so that anode current having a predetermined magnitude will flow when no signal is applied to said control electrode, and we provide means to produce a current to oppose said anode current such that the net current flow through said indicator is zero when no signal is applied to said control electrode. We provide selector means to select a predetermined combination of load resistance and anode voltage for each desired sensitivity range. The relative magnitudes of load resistance are chosen so as to provide the desired relation between the various sensitivity ranges. The relative magnitudes of the anode voltages are chosen such that load lines drawn for each sensitivity range will intersect at a common point on the anode current versus anode voltage characteristic of said discharge device, which common point represents an anode current having said predetermined magnitude. Thus, the indicator device will register zero on every sensitivity range when no direct current signal is present, and consequently, change of sensitivity range does not disturb the indicator device.

Figure 2:
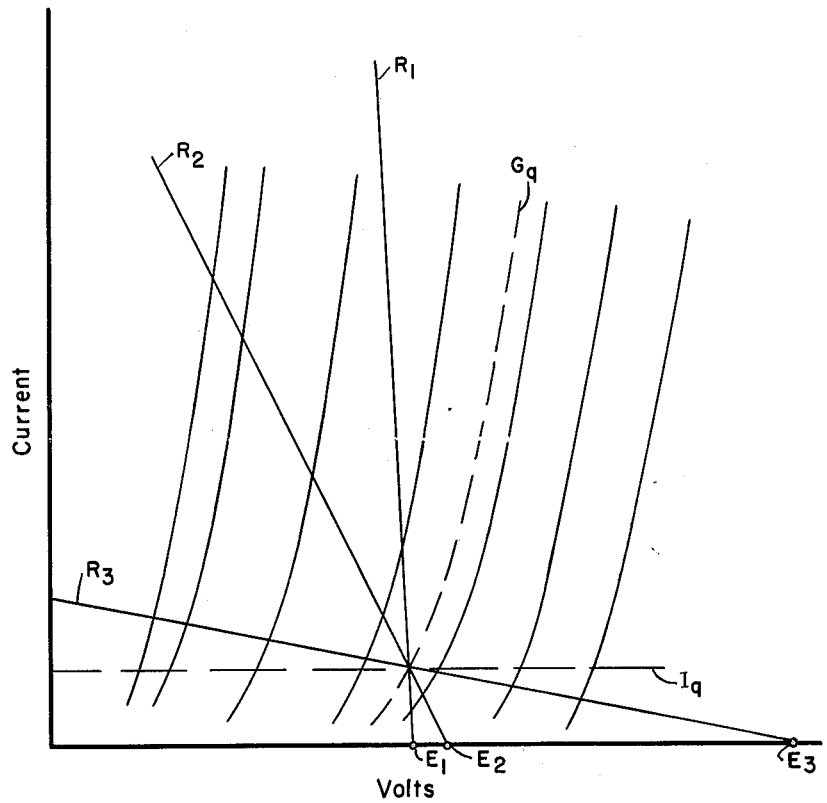

The features of our invention, which we consider novel, are set forth in the appended claim. The invention, together with additional objects and advantages thereof, will be understood from the following description of a specific embodiment when read in connection with the accompanying drawings in which:

Figure 1 is a schematic diagram showing a preferred embodiment of our invention, and Fig. 2 is a plot showing the anode current versus anode voltage characteristics for a discharge device used in one embodiment of our invention.

In Fig. 1 there is shown a wide range direct current amplifier which utilizes the teachings of our invention. Three stages of amplification are provided, each comprising a multi-electrode electron discharge device 11, 13, 15 having an anode 17, a cathode 19, and control, screen, and suppressor electrodes 21, 23, 25 respectively. Screen grid 23 and anode 17 operating potentials for the first and second amplifier tubes 11, 13 are derived from a series circuit comprising a first battery 27 and four resistors 29, 31, 33, 35, the negative terminal of the first battery 27 being connected to ground 37. The screen electrode or grid 23 of the first amplifier tube 11 is connected to the junction of the first and second resistors 29, 31, the anode 17 of the first amplifier 11 is connected through a dropping resistor 39 to the junction of the second and third resistors 31, 33, the screen grid 23 of the second amplifier tube 13 is connected to the junction of the third and fourth resistors 33, 35, and the anode 17 of the second amplifier 13 is connected through a dropping resistor 41 to the second and third contacts 43, 45 of a first three-position selector switch 47, the moving contact 49 of which is connected to the positive terminal of the first battery 27. The first contact 51 of this switch 47 is floating. The filament supply circuit for the three amplifier tubes 11, 13, 15 may be traced from the positive terminal of a second battery 53 through a second three-position selector switch 55, the cathode 19 of the second amplifier tube 13, the cathode 19 of the third amplifier tube 15, a resistor 57, the cathode 19 of the first amplifier tube 11 which is shunted by a resistor 59, to the negative terminal of the second battery 53 which is connected to ground 37. The movable contact 61 of the second selector switch 55 is connected to the positive terminal of the second battery 53, the first contact 63 is floating, and the second and third contacts 65, 67 are connected to the cathode of the second amplifier tube 13. The suppressor electrodes or grids 25 of the three amplifier tubes 11, 13, 15 are connected to their respective cathodes 19, and the screen grid 23 of the third amplifier tube 15 is connected to its anode 17. The anode 17 of the first amplifier tube 11 is connected directly to the control electrode, or grid 21, of the second amplifier tube 13. The anode 17 of the second amplifier tube 13 is connected to the positive terminal of the bias battery 69, the negative terminal of which is connected to the control electrode 21 of the third amplifier tube 15. Anode voltage is supplied to the third amplifier tube 15 by means of a third battery 71 having two voltage taps 73, 75.

The amplifier is provided with three sensitivity ranges, selectable by means of a third three-position selector switch 77. The positive terminal of the third battery 71 is connected to the anode 17 of the third amplifier tube 15, and the negative terminal of this battery is connected through a first load resistor 79 to the first contact 81 of the third selector switch 77. The first tap 73 of the third battery 71 is connected through a second load resistor 83 to the second contact 85 of the third selector switch 77. The second tap 75 of the third battery 71 is connected through a third load resistor 87 to the third contact 89 of the third selector switch 77. The movable contact 91 of the third selector switch 77 is connected to the third contact 93 of a fourth selector switch 95. The third contact 89 of the third selector switch 77 is connected to the second contact 97 of the fourth selector switch 95. The first contact 99 of the fourth selector switch 95 is connected to ground. The movable contact 101 of the fourth selector switch 95 is connected through an indicator device 103, which is in this case a microammeter, to ground 37.

One hundred percent negative feedback is obtained by feeding the output of the third amplifier tube through a resistor network 105, back to the control electrode 21 of the first amplifier tube 11. The resistor network 105 comprises three potentiometers 107, 109, 111 connected in parallel. One terminal of the network 105 is connected through a resistor 113 and a variable resistance 115 to the positive terminal of the third battery 71. The other terminal of the network 105 is connected through a resistor 117 to the second tap of the third battery. The movable contacts 119, 121, 123 of the potentiometers 107, 109, 111 are connected respectively to the first, second and third contacts 125, 127, 129 of a fifth three-position selector switch 131. The movable contact 133 of the fifth selector switch 131 is connected to the third contact 135 of a sixth three-position selector switch 137. The third contact of the fifth selector switch 131 is connected to the first and second contacts 139, 141 of the sixth selector switch 137. The movable contact 143 of the sixth selector switch 137 is connected through a resistor 145 to the control electrode 21 of the first amplifier tube 11. The third contact 67 of the second selector switch 55 is connected through a resistor 147 to the movable contact 101 of the fourth selector switch 95. The control electrode 21 of the third amplifier tube 15 is connected in series with a resistor 149 and a capacitor 151 to ground 37. The first, second, fourth, and sixth selector switches 47, 55, 95, 137 are ganged, and the third and fifth selector switches 77, 131 are ganged.

The wide range amplifier just described, with the exception of the sensitivity control arrangement, is similar to the amplifier described by Harnwell and Ridenour in an article entitled "Degenerative electrometer tube amplifier" which appeared in the Review of Scientific Instruments 11,346 (1940). It is therefore considered unnecessary to set forth in detail herein, the operation of the amplifier per se.

Our invention is directed to the arrangement for switching sensitivity while maintaining a fixed quiescent point. The invention permits the switching of sensitivity without disturbing, or requiring zero adjustment of the indicating meter. In order to have a plurality of sensitivity ranges for a meter, it is apparent that some means must be provided to make the meter less sensitive to large signals than to small signals. In the case of an electron tube direct current amplifier, where the direct current signal to be measured is applied to the control electrode of the amplifier tube, and the current indicator is connected in the anode-cathode circuit of the tube, one way to change sensitivity is to change the anode circuit load resistance. However, for a given magnitude of bias on the control electrode of the amplifier tube at quiescence, and for a given magnitude of anode operating potential, a different magnitude of current will flow through the indicator for each different magnitude of load resistance, when no signal is applied to the control electrode of the amplifier tube. Under such conditions, the indicator would have to be separately adjusted to read zero, for every change of sensitivity range. On the other hand, if proper magnitudes of both anode operating potential and anode load resistance are selected for each different sensitivity range, then it is possible to change sensitivity ranges without disturbing the indicator device.

The principles of our invention may be further explained by reference to Fig. 2 of the drawings. In Fig. 2, there is shown a family of curves depicting the relationship between anode voltage and anode current for various magnitudes of control grid current in a direct current amplifier tube. Anode current is plotted as ordinate and anode voltage as abscissa. The control grid bias on the amplifier tube is adjusted so that anode current of a predetermined magnitude will flow at quiescence, that is, when no direct current signal is applied to the amplifier control grid. Anode current at quiescence is represented by line $I_q$ in Fig. 2. This quiescent current is cancelled in the indicator by an equal and opposite current which is provided from an auxiliary source, so that the net indicator current at quiescence is zero. Once the desired relationship between the various sensitivity ranges is chosen, the magnitude of load resistance for each sensitivity range may be chosen. For example, if it is desired that adjacent sensitivity ranges be related by a power of ten, then the magnitudes of the load resistance should be related by a power of ten. Now a load line is drawn for each sensitivity range. The slope of each load line will of course be determined by the magnitude of the respective load resistance. Each load line should be located to pass through the intersection of the curve representing quiescent control grid bias (designated $G_q$) and the line $I_q$ representing quiescent anode current. These load lines are designated in Fig. 2 as $R_1$, $R_2$, $R_3$. The load lines $R_1$, $R_2$, $R_3$ intersect the abscissa of Fig. 2 at points $E_1$, $E_2$ and $E_3$, respectively. The magnitudes of voltage at these points $E_1$, $E_2$, and $E_3$, then are the magnitudes of the voltage that must be applied in the anode circuit of the amplifier, with load resistances $R_1$, $R_2$, and $R_3$, respectively, in order that the indicator device will read zero at quiescence for every sensitivity range.

In the operation of the specific embodiment of our invention shown in Fig. 1, the apparatus is initially calibrated by proper adjustment of the potentiometers 111, 109, 107. For calibration the first, second, fourth and sixth selector switches 47, 55, 95, 137 are closed on their third contacts so that operating potentials are applied to the tubes 11, 13 and 15. Then the feedback potentiometers 111, 109, 107 are adjusted so that the indicator 103 reads zero for each position of the third and fifth selector switches 77, 131, thus adjusting the feedback to give the proper grid bias for quiescence on the first amplifier tube 11. Fine zero adjustment of the indicator 103 is obtained by moving the first, second, fourth and sixth selector switches 47, 55, 95, 137 to their second contact positions. In their second contact position, the fourth and sixth selector switches automatically select the proper load resistance and voltage combination for the highest sensitivity range and also the corresponding potentiometer. The variable resistance 115 is then adjusted so that the indicator 103 reads zero. The equipment is now ready for operation. The input signal may now be applied to the control electrode 21 of the first amplifier tube 11, and the indicator 103 will show the magnitude of the input signal. The meter 103 will automatically register zero with no input signal, regardless of the particular sensitivity range employed.

While we have shown our invention in only one form, it will be obvious to those skilled in the art that it is not so limited, but is susceptible of various changes and modifications without departing from the spirit thereof.

We claim as our invention:

In a multi-range apparatus for measuring direct currents; an amplifier with zero compensating means for each range comprising an electron discharge device, having an anode, a cathode, and a control electrode; means adapted to connect a source of direct current signals to said control electrode; a direct current meter connected in the anode-cathode circuit of said discharge device to indicate the magnitude of such signals; means for biasing said grid electrode to cause direct current of a predetermined magnitude to flow in the anode-cathode circuit of said discharge device with no signal applied to said grid electrode; bucking means connected to cause current having said predetermined magnitude but opposite polarity to flow thru said meter such that the net current flow thru said meter is zero when no signal is applied to said control grid; a plurality of direct current anode voltage sources, each connected in series with a resistor; means for selectively connecting any one of said voltage sources and its corresponding resistor in the anode-cathode circuit of said discharge device, the magnitudes of said resistors being such as to provide a plurality of sensitivity ranges for said meter, and the magnitudes of said voltage sources being such as to cause the load lines for each sensitivity range to intersect at a common point equivalent to a zero indication and at a predetermined current magnitude on the anode current versus anode voltage characteristic for said discharge device whereby any one of the plurality of sensitivity ranges may be selected without disturbing the zero adjustment of said indicator.

References Cited in the file of this patent

UNITED STATES PATENTS

| | | |
|---|---|---|
| 2,355,068 | Graves | Aug. 8, 1944 |
| 2,421,578 | Reason | June 3, 1947 |
| 2,481,500 | Crowl | Sept. 13, 1949 |
| 2,520,766 | Hathaway | Aug. 29, 1950 |
| 2,555,306 | Atkinson | June 5, 1951 |

FOREIGN PATENTS

| | | |
|---|---|---|
| 407,458 | Great Britain | Mar. 22, 1934 |
| 644,464 | Germany | May 4, 1937 |